US010552427B2

(12) United States Patent
Shukla et al.

(10) Patent No.: US 10,552,427 B2
(45) Date of Patent: Feb. 4, 2020

(54) SEARCHING FOR INFORMATION RELATING TO VIRTUALIZATION ENVIRONMENTS

(71) Applicant: Nutanix, Inc., San Jose, CA (US)

(72) Inventors: Himanshu Shukla, San Jose, CA (US); Venkata Vamsi Krishna Kothuri, San Jose, CA (US); Atreyee Maiti, Sunnyvale, CA (US); Rahul Singh, Mountain View, CA (US); Ziv Kennan, Sunnyvale, CA (US)

(73) Assignee: NUTANIX, INC., San Jose, CA (US)

( * ) Notice: Subject to any disclaimer, the term of this patent is extended or adjusted under 35 U.S.C. 154(b) by 173 days.

(21) Appl. No.: 15/143,060

(22) Filed: Apr. 29, 2016

(65) Prior Publication Data
US 2017/0316006 A1    Nov. 2, 2017

(51) Int. Cl.
| G06F 16/2457 | (2019.01) |
| H04L 29/08 | (2006.01) |
| G06F 16/248 | (2019.01) |
| G06F 16/951 | (2019.01) |
| H04L 29/06 | (2006.01) |
| G06F 16/2452 | (2019.01) |

(52) U.S. Cl.
CPC ...... *G06F 16/24578* (2019.01); *G06F 16/248* (2019.01); *G06F 16/24522* (2019.01); *G06F 16/951* (2019.01); *H04L 67/1097* (2013.01); *H04L 67/38* (2013.01)

(58) Field of Classification Search
CPC ............. G06F 16/242; G06F 16/24522; G06F 16/24578; G06F 16/951; G06F 16/248; G06F 17/30864; G06F 17/3053; G06F 17/30554; H04L 67/1097; H04L 67/38
USPC ....... 707/713, 723, 736, 748, 755, 756, 759, 707/769
See application file for complete search history.

(56) References Cited

U.S. PATENT DOCUMENTS

| 5,661,668 | A | 8/1997 | Yemini et al. |
| 6,681,344 | B1 | 1/2004 | Andrew |
| 7,051,023 | B2 | 5/2006 | Kapur et al. |
| 7,107,185 | B1 | 9/2006 | Yemini et al. |
| 7,237,266 | B2 | 6/2007 | Aaron |
| 7,346,629 | B2 | 3/2008 | Kapur et al. |

(Continued)

OTHER PUBLICATIONS

International Search Report and Written Opinion for PCT/US2017/030256, dated Sep. 25, 2017.

(Continued)

*Primary Examiner* — Hares Jami
(74) *Attorney, Agent, or Firm* — Foley & Lardner LLP

(57) ABSTRACT

In one embodiment, a method may comprise receiving a query to search for one or more entities of the data center, the query including one or more query tokens. The method may then identify one or more entity-type nodes corresponding to the query, and rank the entity-type nodes based on a score determined for each of the identified entity-type nodes. For at least a portion of the ranked entity-type nodes, the method may generate a structured query associated with each of the entity-type nodes based at least in part of one or more activity-type nodes connected to each of the entity-type nodes. Then, the method may retrieve, based on the structured queries, results from one or more databases.

19 Claims, 12 Drawing Sheets

(56) References Cited

U.S. PATENT DOCUMENTS

| | | | | |
|---|---|---|---|---|
| 7,953,746 | B1* | 5/2011 | Garg | G06F 17/30864 707/762 |
| 8,090,724 | B1* | 1/2012 | Welch | G06F 17/30616 707/750 |
| 8,549,518 | B1 | 10/2013 | Aron et al. | |
| 8,601,473 | B1 | 12/2013 | Aron et al. | |
| 8,738,972 | B1 | 5/2014 | Bakman et al. | |
| 8,751,867 | B2 | 6/2014 | Marvasti et al. | |
| 8,775,411 | B1 | 7/2014 | Ransil et al. | |
| 8,850,130 | B1 | 9/2014 | Aron et al. | |
| 9,772,866 | B1 | 9/2017 | Aron et al. | |
| 9,882,798 | B2 | 1/2018 | Padala et al. | |
| 2002/0093527 | A1 | 7/2002 | Sherlock et al. | |
| 2007/0027801 | A1 | 2/2007 | Botzer et al. | |
| 2008/0263009 | A1 | 10/2008 | Buettner et al. | |
| 2009/0064053 | A1* | 3/2009 | Crawford | G06F 3/04845 715/854 |
| 2010/0114561 | A1 | 5/2010 | Yasin | |
| 2010/0306191 | A1 | 12/2010 | Lebeau et al. | |
| 2011/0087644 | A1 | 4/2011 | Frieden et al. | |
| 2011/0131242 | A1 | 6/2011 | Bent et al. | |
| 2013/0124571 | A1* | 5/2013 | Yasufuku | H04N 21/251 707/797 |
| 2013/0138646 | A1 | 5/2013 | Sirer et al. | |
| 2014/0129536 | A1* | 5/2014 | Anand | G06Q 10/0635 707/706 |
| 2014/0188899 | A1* | 7/2014 | Whitnah | G06Q 10/10 707/749 |
| 2014/0365522 | A1 | 12/2014 | Soundararajan et al. | |
| 2015/0244743 | A1 | 8/2015 | Jagad et al. | |
| 2015/0381409 | A1 | 12/2015 | Margalit et al. | |
| 2016/0198043 | A1 | 7/2016 | Kaminogo et al. | |
| 2016/0217381 | A1 | 7/2016 | Bloomquist et al. | |
| 2016/0224666 | A1 | 8/2016 | Horvitz et al. | |
| 2016/0275188 | A1 | 9/2016 | Hewitt et al. | |
| 2017/0017537 | A1 | 1/2017 | Razin et al. | |
| 2017/0039281 | A1 | 2/2017 | Venkata et al. | |
| 2017/0102988 | A1 | 4/2017 | Purushothaman et al. | |
| 2017/0139987 | A1* | 5/2017 | Weyerhaeuser | G06F 17/30427 |
| 2017/0201851 | A1* | 7/2017 | Huang | G06F 17/30303 |
| 2018/0089328 | A1 | 3/2018 | Bath et al. | |
| 2018/0246811 | A1 | 8/2018 | Bonanno et al. | |
| 2018/0351838 | A1 | 12/2018 | Lui | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible"(Jan. 12, 2016), from https://nutanixbible.com/

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Turbonomic.com, Turbonomic_Solving_the_Right Problem_in_the_Data_Center, Turbonomic White Paper, 2015 Turbonomic, Inc.

vRealize Operations Manager Best Practices, Supplemental Guide, Version 7.x, Sep. 2018, Version 1.4.

vRealize Operations Manager Customization and Administration Guide, vRealize Operations Manager 6.1, EN-001857-02, VMware.

YouTube Video screenshots for DataDog, DataDog Overview, Youtube, Mar. 9, 2016, https://www.youtube.com/watch?v=0-YMPk4kdTo&feature=youtu.be [youtube.com].

YouTube Video screenshots for VR Ops , VMware Cloud Management, VRealize Operations 6.6-Trouble Shoot a VM Dashboard, YouTube, Jul. 12, 2017, https://www.youtube.com/watch?v=kSiQUc80f2w&feature=youtu.be [youtube.com].

Application Performance "Demo of AppDynamics from Application Performance," (accessed Oct. 1, 2019) retrieved from https://www.youtube.com/watch?v=2wsqGtxhdiw (Published May 16, 2017).

Tech Field Day, "Turbonomic with Public Cloud, Hybrid Cloud, Containers with Mor Cohen-Tal," (accessed Oct. 1, 2019) retrieved from https://www.youtube.com/watch?v=od7_cYzqK28, (Published May 15, 2017).

* cited by examiner

SEARCHING FOR INFORMATION RELATING TO VIRTUALIZATION ENVIRONMENTS

TECHNICAL FIELD

This disclosure generally relates to an intelligent, keyword-based search of entities in virtualization environments, properties of these entities, or actions associated with these entities.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY OF PARTICULAR EMBODIMENTS

Embodiments of the present invention provide an architecture for managing I/O operations and storage devices for a virtualization environment. According to some embodiments, a Controller/Service VM is employed to control and manage any type of storage device, including direct-attached storage in addition to network-attached and cloud-attached storage. The Controller/Service VM implements the Storage Controller logic in the user space, and with the help of other Controller/Service VMs running on physical host machines in a cluster, virtualizes all storage resources of the various physical host machines into one global logically-combined storage pool that is high in reliability, availability, and performance. Each Controller/Service VM may have one or more associated I/O controllers for handling network traffic between the Controller/Service VM and the storage pool.

Embodiments of the present invention provide an architecture and user interface for searching for information on entities in the virtualization environment, including properties of these entities, and actions, alert information, and help information associated with these entities. According to some embodiments, the present invention provides an intelligent, keyword-based, context-sensitive search that may interpret the relationship between words of a search query and the intent of the user to provide relevant results aggregated from various data sources and presented to the user in a unified manner.

In particular embodiments, a search-engine system associated with the virtualization environment may receive a query to search for one or more entities of the data center The query may include one or more query tokens. The search-engine system may then identify one or more entity-type nodes corresponding to the query, and rank the entity-type nodes based on a score determined for each of the identified entity-type nodes. For at least a portion of the ranked entity-type nodes, the search-engine system may generate a structured query associated with each of the entity-type nodes based at least in part of one or more activity-type nodes connected to each of the entity-type nodes. Then, the search-engine system may retrieve, based on the structured queries, results from one or more databases.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments of the present invention provide an architecture and user interface for searching for information on entities in the virtualization environment, including properties of these entities, and actions, alert information, and help information associated with these entities. According to some embodiments, the present invention provides an intelligent, keyword-based, context-sensitive search that may interpret the relationship between words of a search query and the intent of the user to provide relevant results aggregated from various data sources and presented to the user in a unified manner.

In particular embodiments, a search-engine system associated with the virtualization environment may receive a query to search for one or more entities of the data center The query may include one or more query tokens. The search-engine system may then identify one or more entity-type nodes corresponding to the query, and rank the entity-type nodes based on a score determined for each of the identified entity-type nodes. For at least a portion of the ranked entity-type nodes, the search-engine system may generate a structured query associated with each of the entity-type nodes based at least in part of one or more activity-type nodes connected to each of the entity-type nodes. Then, the search-engine system may retrieve, based on the structured queries, results from one or more databases.

Figure 1A:
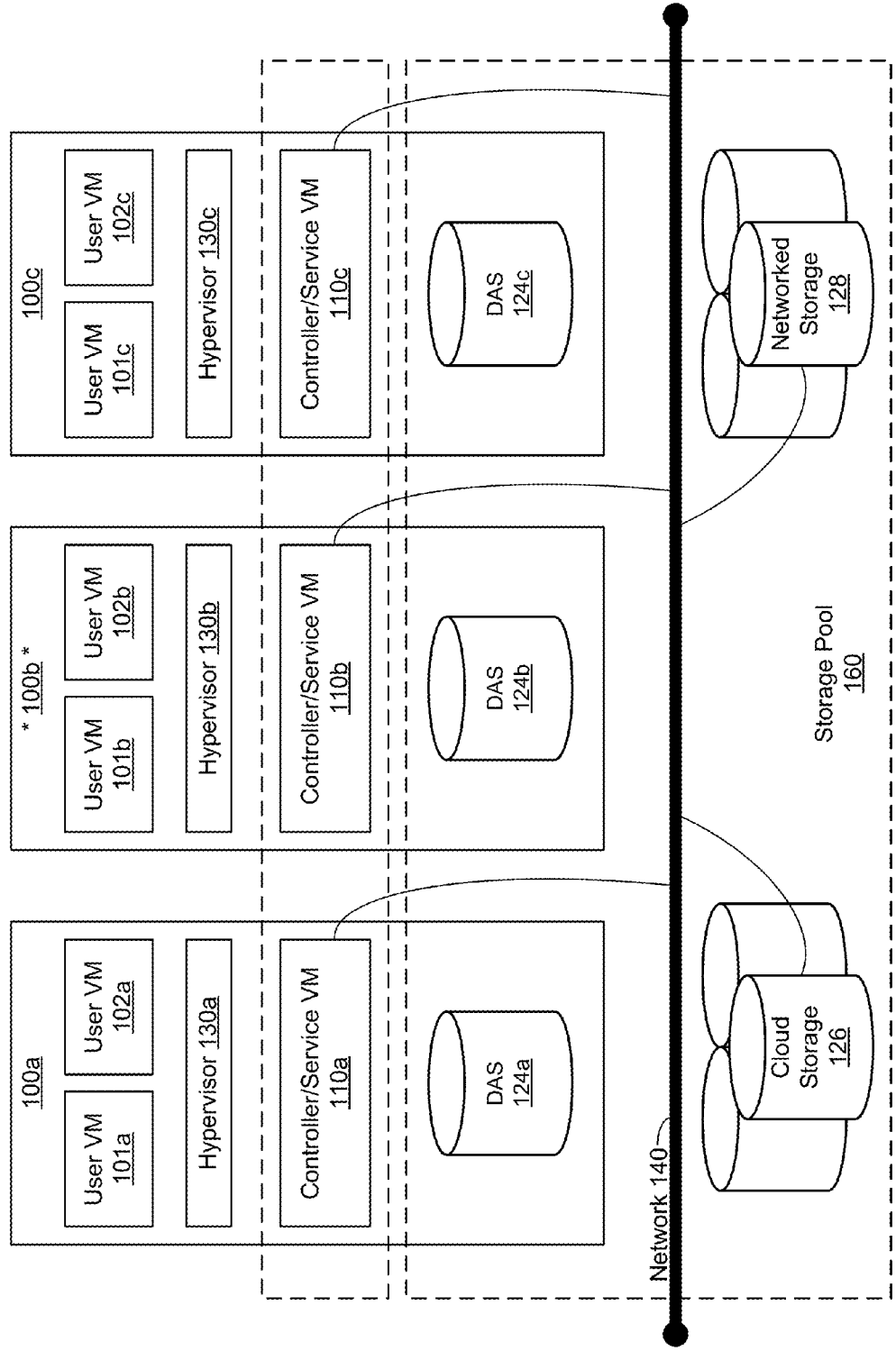
FIG. 1A illustrates a clustered virtualization environment according to some embodiments of the invention.

FIG. 1A illustrates a clustered virtualization environment according to some embodiments of the invention. The architecture of FIG. 1A can be implemented for a distributed platform that contains multiple hardware nodes 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits direct-attached storage (DAS) 124a-c that is within or directly attached to the server and/or appliance to be managed as part of storage pool 160. Examples of such storage include Solid State Drives (henceforth "SSDs"), Hard Disk Drives (henceforth "HDDs" or "spindle drives"), optical disk drives, external drives (e.g., a storage device connected to a hardware node via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM to be used by a user VM. In some embodiments, the vDisk is exposed via iSCSI ("internet small computer system interface") or NFS ("network file system") and is mounted as a virtual disk on the user VM.

Each hardware node 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140.

Special VMs 110a-c are used to manage storage and input/output ("I/O") activities according to some embodiment of the invention, which are referred to herein as "Controller/Service VMs". These special VMs act as the storage controller in the currently described architecture. Multiple such storage controllers coordinate within a cluster to form a single-system. Controller/Service VMs 110a-c are not formed as part of specific implementations of hypervisors 130a-c. Instead, the Controller/Service VMs run as virtual machines on the various hardware nodes 100, and work together to form a distributed system 110 that manages all the storage resources, including DAS 124a-c, networked storage 128, and cloud storage 126. The Controller/Service VMs may connect to network 140 directly, or via a hypervisor. Since the Controller/Service VMs run independent of hypervisors 130a-c, this means that the current approach can be used and implemented within any virtual machine architecture, since the Controller/Service VMs of embodiments of the invention can be used in conjunction with any hypervisor from any virtualization vendor.

A hardware node may be designated as a leader node. For example, hardware node 100b, as indicated by the asterisks, may be a leader node. A leader node may have a software component designated as a leader. For example, a software component of Controller/Service VM 110b may be designated as a leader. A leader may be responsible for monitoring or handling requests from other hardware nodes or software components on other hardware nodes throughout the virtualized environment. If a leader fails, a new leader may be designated.

Each Controller/Service VM 110a-c exports one or more block devices or NFS server targets that appear as disks to user VMs 101a-c and 102a-c. These disks are virtual, since they are implemented by the software running inside Controller/Service VMs 110a-c. Thus, to user VMs 101a-c and 102a-c, Controller/Service VMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize DAS 124 as disclosed herein. This is because I/O performance is typically much faster when performing access to DAS 124 as compared to performing access to networked storage 128 across a network 140. This faster performance for locally attached storage 124 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
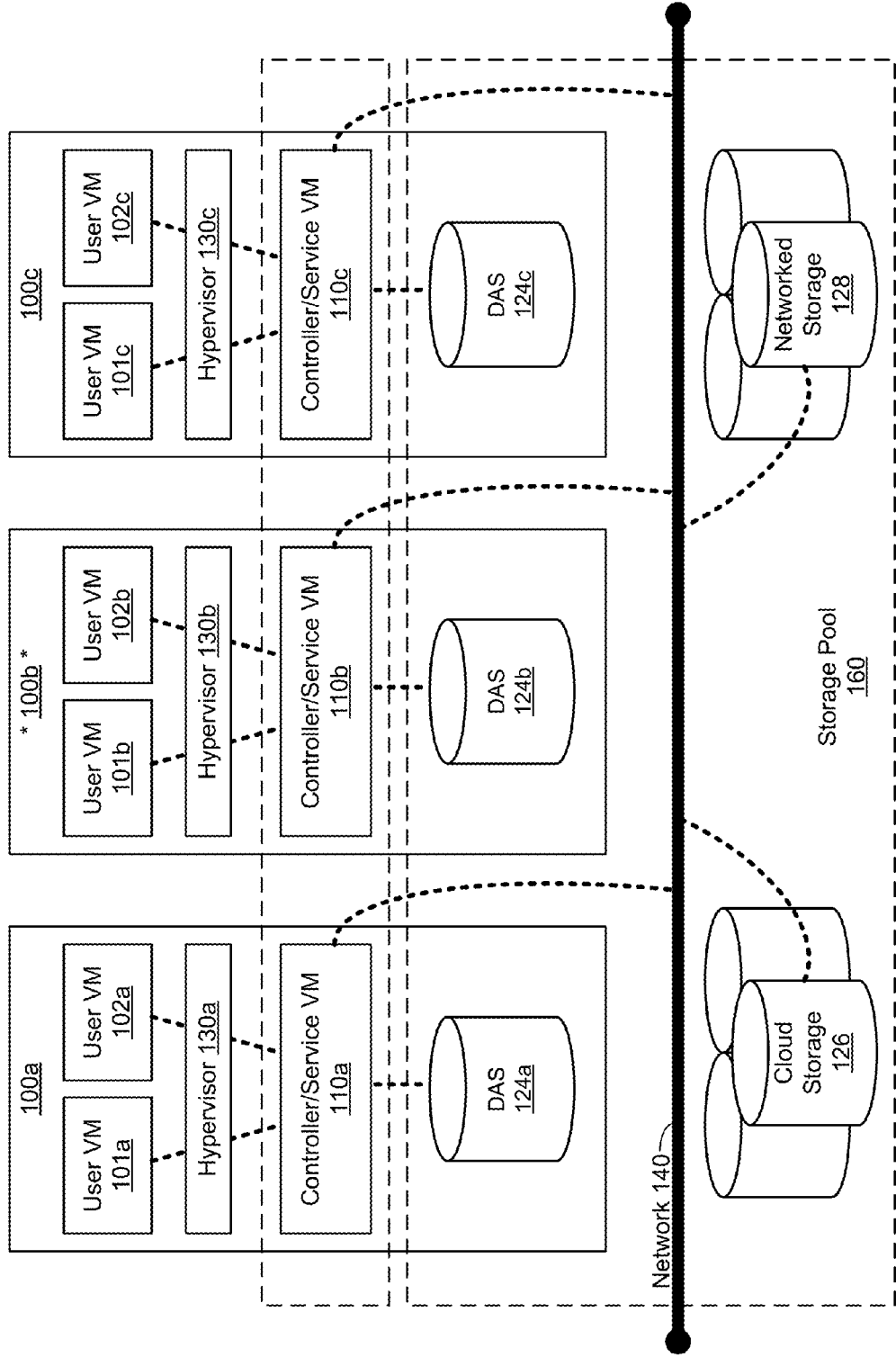
FIG. 1B illustrates data flow within a clustered virtualization environment according to some embodiments of the invention.

FIG. 1B illustrates data flow within an example clustered virtualization environment according to some embodiments of the invention. As described above, one or more user VMs and a Controller/Service VM may run on each hardware node 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, Controller/Service VM 110a-c may present an emulated storage controller either to the hypervisor or to user VMs to facilitate I/O operations. Controller/Service 110a-c may be connected to storage within storage pool 160. Controller/Service VM 110a may have the ability to perform I/O operations using DAS 124a within the same hardware node 100a, by connecting via network 140 to cloud storage 126 or networked storage 128, or by connecting via network 140 to DAS 124b-c within another node 100b-c (e.g., via connecting to another Controller/Service VM 110b-c).

Figure 2:
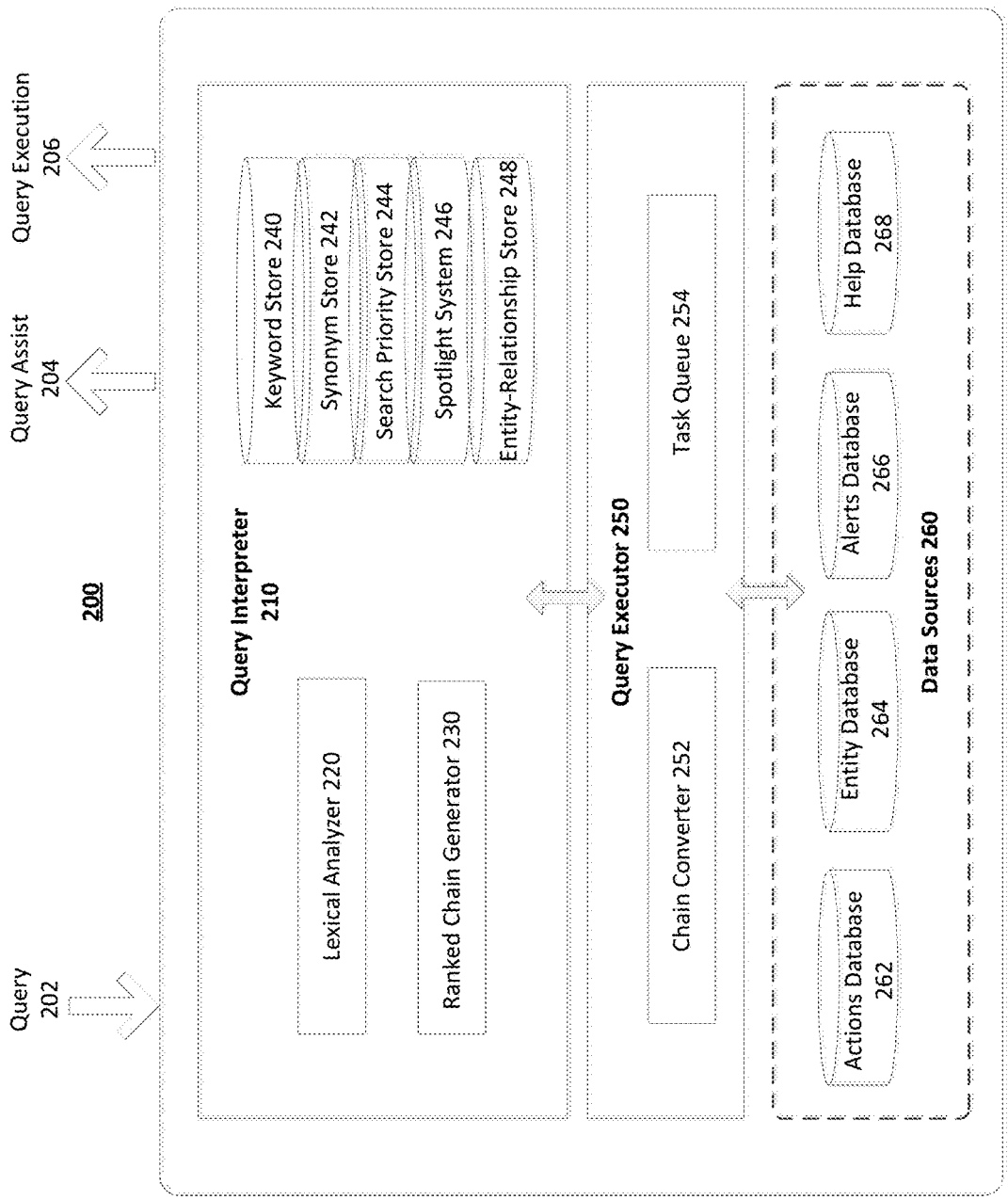
FIG. 2 illustrates an example architecture of various components of a search-engine system according to some embodiments of the invention.

FIG. 2 illustrates an example architecture of various components of a search-engine system associated with virtualization system 100 according to some embodiments of the invention. In some embodiments, search-engine system 200 may receive one or more queries 202, and in response to the processing of these queries 202, may send one or more of output results via query assist 204 and/or query output 206, as discussed below. In some embodiments, search-engine system 200 may include a query interpreter 210 that is responsible for interpreting the query. Query interpreter 210 may include a lexical analyzer 220 and a ranked chain generator 230. Lexical analyzer may interpret the query by tokenizing the sequence of input characters and determine the intent of the user based on the relationship between the various tokens of the query, the grammar of the query, and the context of the query. As an example and not by way of limitation, each token of the query may be bucketized into four different categories: entity types, properties, identifiers, and actions. The category of entity types may include both an entity instance (e.g., an entity associated with a user-defined name) or an entity type (e.g., clusters, nodes, virtual machines, disks, virtual disks, containers, etc.). The category of properties may include attributes of entities (e.g., OS type, NumCPU's, etc.), attribute values (e.g., an IP address, etc.), and metrics/metric names (e.g., CPU utilization, Disk-Space Usage, ipos, etc.). The category of identifiers may include any way to narrow down on the entity instance (e.g., an entity name, an IP address, etc.). The category of actions may include actions that can be carried out on and/or supported by various entities (e.g., create, VM create, clone, poweroff, add node, etc.), and includes workflows (e.g., data recovery, capacity planning, etc.). In addition, search-engine system 200 may accept a limited number of special operators in the grammar of the query (e.g., the "=" operator, the "." operator, other SQL-like query operators, etc.) in order to help restrict the search space delineated by the query. Ranked chain generator 230 may generate ranked chains of entity types and associated actions to send to a query executor 240, as discussed below.

In analyzing the one or more queries 202, lexical analyzer 220 may access a number of databases, including a keyword store 240, a synonym store 242, a search priority store 244, a spotlight store 246, and an entity-relationship store 248. Keyword store 240 may include a dictionary of all keywords associated with all entities in the virtualization environments understood by search-engine system 200, including types of entities, properties of the entities, identifiers associated with the entities, actions associated with the entities, any other information associated with the entities, and any combination thereof. Synonym store 242 may include "human-friendly," colloquial and/or informal synonym names of the keywords included in keyword store 240 (e.g., "host" may be an informal name of "node," etc.). Search priority store 244 may include information on certain entities, entity attributes, metrics, actions, and any combination thereof, that are designated as high importance and are prioritized when ranking and presenting results to a user (e.g., as reflected in a score determined for each identified entity, as discussed below). Spotlight system 246 may comprise a spotlight remote procedure call ("RPC") that is configured to execute a program that attaches a match type and a match score to each of the tokens of the query, as discussed below. Entity relationship store 248 may include an entity-relationship graph that is a representation of all entities associated with virtualization system 100 (e.g., all queryable entities and information/activities associated with these queryable entities), the relationships between these entities (e.g., parent-child relationships), and all attributes, actions, metrics, alerts, and other relevant information associated with each entity.

In some embodiments, search-engine system 200 may further include a query executor 250 that is configured to execute the ranked chains of entity types and associated actions generated by query interpreter 210 by converting the ranked chains into structured queries via a chain converter 252 and storing the structured queries in a task queue 254 to be distributed to data sources 260 to search for matching entity types and associated actions. Data sources 260 includes an actions database 262, an entity database 264, an alerts database 266, and a help database 268. Actions database 262 may include all keywords associated with virtualization system 100 relating to features and actions of entities and workflows. Entity database 264 may include information on entity types, entity names, entity statistics, attribute names, metrics names, and any combination thereof. Alerts database 266 may include all alerts relevant to entities and actions/attributes of entities, including alert types and alert warnings (e.g., unresolved alerts). Help database 268 may include all help information relevant to entities and actions/attributes of entities. Although this disclosure describes a search-engine system 200 associated with virtualization system 100 in a particular manner, this disclosure contemplates any search-engine system associated with any virtualization system in any suitable manner.

Figure 3A:
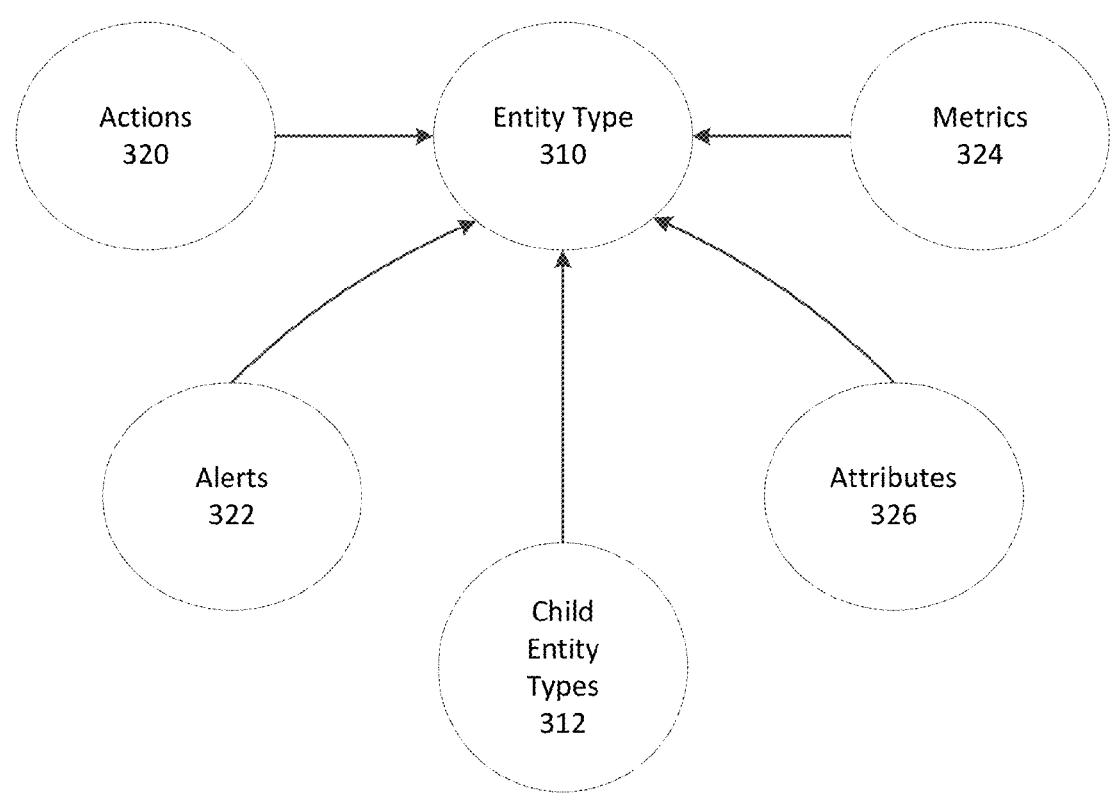
FIGS. 3A-3C illustrate example entity relationship diagrams according to some embodiments of the invention.
Figure 3B:
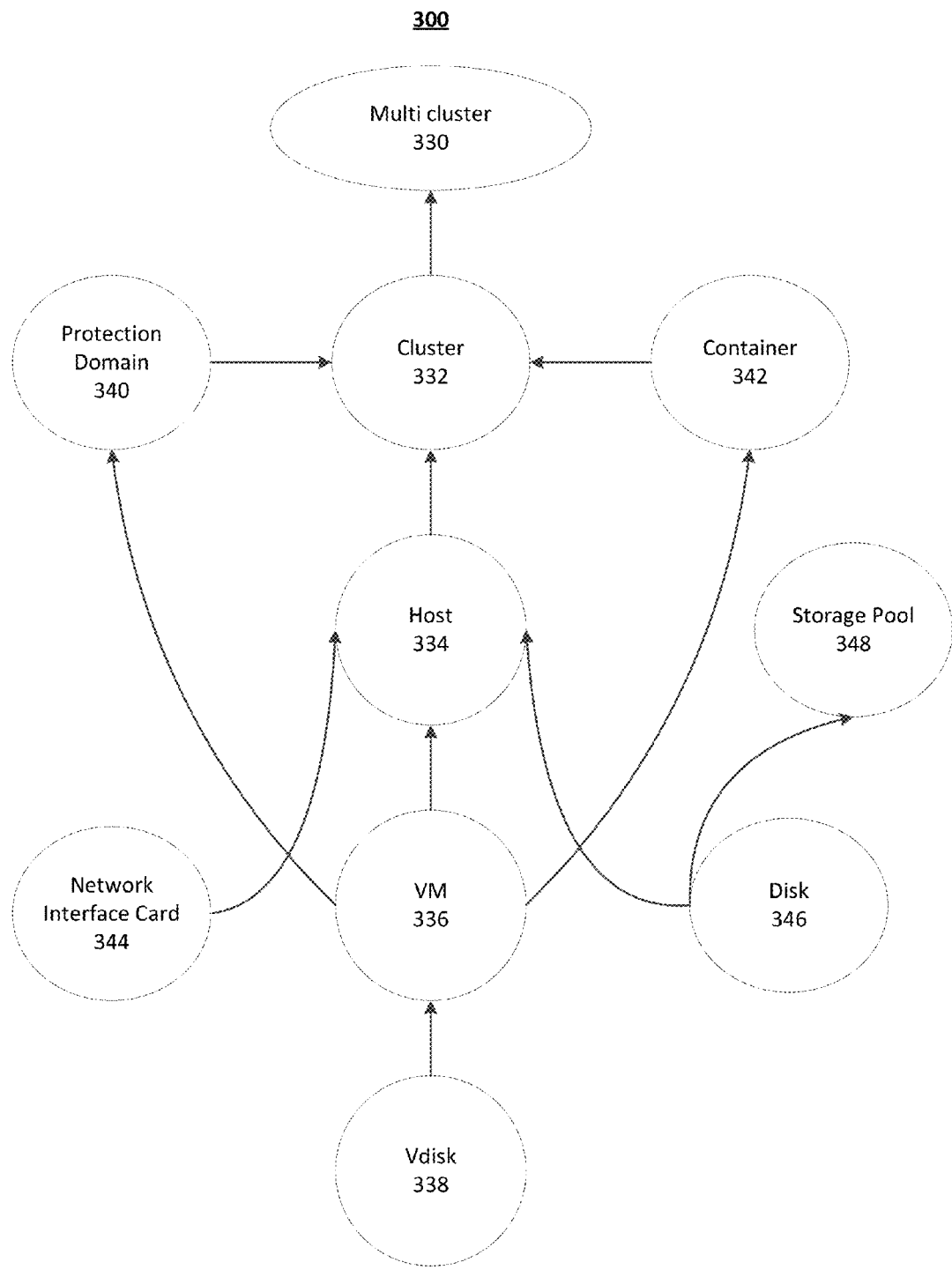
Figure 3C:
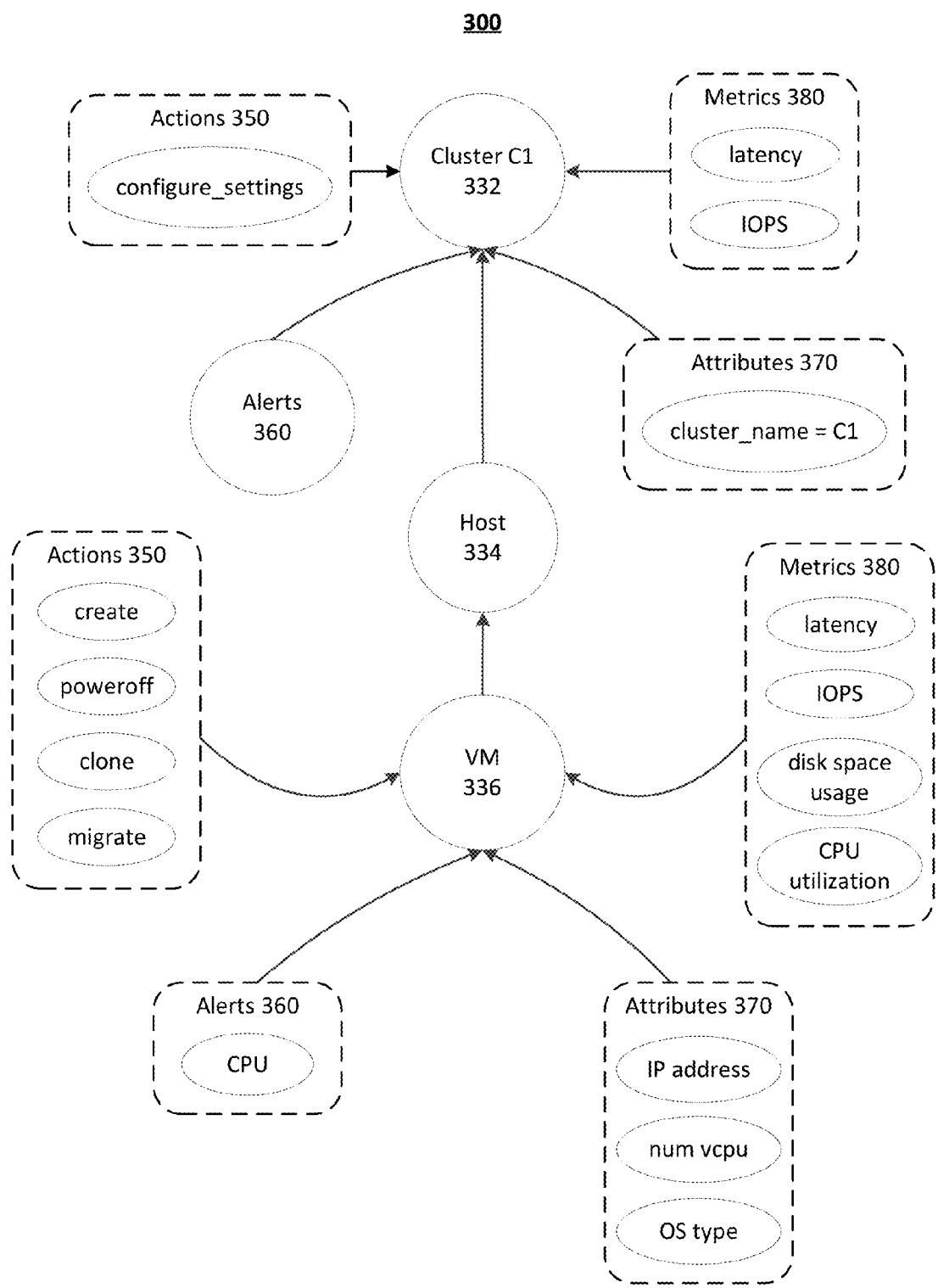

FIGS. 3A-3C illustrate example entity relationship diagrams according to some embodiments of the invention. As shown in FIG. 3A, the basic structure of an entity-relationship graph 300 includes an entity-type node 310 (e.g., a parent entity-type node) connected to a child entity-type node 312. In addition, a plurality of activity-type nodes are connected to entity-type node 310, including an action-type node 320, an alert-type node 322, a metrics-type node 324, and an attributes-type node 326. As an example and not by way of reference, each entity-type node (e.g., entity type node 310, child entity-type node 312, etc.) is connected to at least one of the activity-type nodes. For simplicity, only one node is shown in the basic structure of the entity-relationship graph 300, but this disclosure contemplates that each node type can comprise one or more nodes of that node type. FIG. 3B illustrates example entities associated with virtualization system 100. As shown in FIG. 3B, entity-type nodes 310 and child entity-type nodes 312 may include a multi-cluster-type node 330, a cluster-type node 332, a host-type node 334, a virtual-machine-type node 336, a virtual-disk-type node 338, a protection-domain-type node 340, a container-type node 342, a network-interface-card-type node 344, a disk-type node 346, and a storage-pool-type node 348. In particular embodiments, the direction of the arrow connecting the nodes indicates a child-parent relationship (e.g., the arrow goes from a child node to a parent node). As an example and not by way of limitation, cluster-type node 332 is a child node of multi-cluster-type node 330 and the parent node of protection-domain-type node 340 and container-type node 342. As another example and not by way of limitation, virtual-machine-type node 336 is a child node of protection-domain-type node 340 and container-type node 342, and a parent node of virtual-disk-type node 338. In addition, FIG. 3C illustrates example entities and with example attributes, actions, metrics, alerts, and other information associated with the entities. As an example and not by way of limitation, cluster-type node 332 may be associated with action-type nodes 350 (e.g., configure settings, etc.), alert-type nodes 360, attribute-type nodes 370 (e.g., cluster name "C1") and metric-type nodes 380 (e.g., iops, latency, etc.). As another example and not by way of limitation, virtual-machine-type node 336 may be associated with action-type nodes 350 (e.g., create, poweroff, clone, migrate, etc.), alert-type nodes 360 (e.g., alert types such as cpu, etc.), attribute-type nodes 370 (e.g., num vcpu, IP address, OS type, etc.), and metric-type nodes 380 (e.g., iops, latency, CPU utilization, diskspace usage, etc.).

In some embodiments, search-engine system 200 may receive a query to search for one or more entities of the data center, the query comprising one or more query tokens. The query (e.g., query 202 show in FIG. 2) may be inputted by a user via a user interface associated with search-engine system 200. As an example and not by way of limitation, the user may be searching for entities, some properties of entities, alerts, help or some actions associated with the entities. Users may be able to input keywords, entity names, and a restricted set of operators. Keywords may include entity properties, actions, workflows, and certain words understood by the system. Based on the keywords and entity names inputted by the user, search-engine system 200 will determine the relationship between the words and relevant information on the entities and actions associated with the entities, as discussed below.

In some embodiments, search-engine system 200 may maintain a database of tokens comprising all keywords associated with the one or more entities. As an example and not by way of limitation, as discussed above, keyword store 240 of query interpreter 210 may include a dictionary of all keywords associated with all entities in the virtualization environments understood by search-engine system 200, including types of entities, properties of the entities, identifiers associated with the entities, actions associated with the entities, any other information associated with the entities, and any combination thereof. In addition, as discussed above, entity database 264 of data sources 260 may include information on entity types, entity names, entity statistics, attribute names, metrics names, and any combination thereof.

In some embodiments, the one or more query tokens may be determined by parsing the query into query tokens that match one or more tokens of the database of tokens. Search-engine system 200 may operate query assist 204 (e.g., as show in FIG. 2) while the user is typing in the query. In some embodiments, after receiving a portion of a completed query (e.g., after the user begins typing keywords, but before he finishes typing the entire query), search-engine system 200 may determine whether the portion of the completed query corresponds to any of the keywords in the database of tokens, and suggest to the user one or more of the corresponding keywords that are determined to potentially match or correspond to the user's incomplete query (e.g., an autocomplete function). In some embodiments, after receiving a completed query from the user (e.g., the user has completed typing in his entire query), search-engine system 200 may analyze the user input and visually indicate if one or more of the query tokens do not match at least one of the keywords in the databases of tokens (e.g., underline using a particular color such as red, highlight, any other visual indication, and any combination thereof). In some embodiments, when a user pauses in his typing of the search query but before submitting a completed query, a preview of search results may be displayed to the user, as discussed below. Although this disclosure describes processing of queries in a particular manner, this disclosure contemplates the processing of queries in any suitable manner.

In some embodiments, search-engine system 200 may identify one or more entity-type nodes corresponding to the query. Search-engine system 200 may parse the query into the one or more query tokens and perform lexical analysis on the combination of query tokens. As an example and not by way of limitation, search-engine system 200 may parse the query by accessing keyword store 240 to search the dictionary of all keywords associated with all entities in the virtualization environments understood by search-engine system 200 to determine one or more keywords that match the query tokens and a score associated with each match to the query tokens. The "matching" of the query tokens may include exact matches or "fuzzy" matches, which includes synonym matching, wildcard matching, prefix matching, middle matching, end matching, and any combination thereof. As an example and not by way of limitation, the "degree" of matching may correspond to the score associated with each match to the query tokens such that exact matches and near-exact matches will correspond to higher scores than less exact matches. In some embodiments, search-engine system 200 may search an entity-relationship database (e.g., entity-relationship store 248) to identify the entity-type nodes of an entity-relationship graph (e.g., corresponding to entity types, attribute names, metric names, etc.) that match each of the query tokens. As discussed above with regard to FIGS. 3A-3C, the entity-relationship graph may include the one or more entity-type nodes and the one or more activity-type nodes in parent-child node relationships. The one or more activity-type nodes may include one or more attribute-type nodes, one or more action-type nodes, one or more metric-type nodes, one or more alert-type nodes, or any combination thereof. In some embodiments, each of the entity-type nodes may be connected to at least one of the activity-type nodes. In some embodiments, search-engine system 200 may identify at least one entity-type node in the query. In some embodiments, search-engine system 200 may determine that the query does not specify any entity types, and identify a pre-defined default entity type. As an example and not by way of limitation, if the query inputted by the user does not specify an entity type (e.g., only includes an action, action, metric, alert, other information, or any combination thereof), search-engine system 200 may designate a default entity type of "cluster." In some embodiments, any outputs (e.g., matches) from entity database 248 may be further processed through search priority store 244, which includes include information on entities, entity attributes, metrics, actions, and any combination thereof, that are designated as high importance and are prioritized when ranking the results. As an example and not by way of limitation, the higher the importance and/or priority associated with entity, activity, or any combination thereof, the higher the associated score will be. In addition, in some embodiments, the query tokens may be processed through synonym store 242, which includes "human-friendly," colloquial and/or informal synonym names of the keywords included in keyword store 240, and may be used to generate additional "matching" entities nodes and/or activity-type nodes.

In some embodiments, search-engine system 200 may further process the query by editing the query itself to increase the breadth of the search query and results. As an example and not by way of limitation, search-engine 200 may edit the query through word removal (e.g., removing words such as "of," "an," "the," etc.), stemming (e.g., removal of the "stems" of words, such as editing "tests" or "tested" to 37 test), one character correction (e.g., correcting "clutter" to "cluster"), phase matching (e.g., matching query language of "type of hyperviser" to "hypervisor type"), and editing distances (e.g., "number of" vs. "number of CPUs" results in an edit distance of 4, which "number of" vs. "number of nodes" results in an edit distance of 5). Generally, the more processing that is performed on the query, the lower the associated score, and the less processing that is performed on the query, the higher the associated score. As another example and not by way of limitation, a query of "virtual machines type of hypervisors" may be processed through word removal to remove "of" to become "virtual machine type hypervisors." Then, this resulting query may be processed through stemming to remove the "s" from "hypervisor" to become "virtual machine type hypervisor." This resulting query may then be processed through phrase matching to determine that: (1) "virtual machine type hypervisor" returns no matches with the keywords in keyword store 240 or the entity-type nodes or activity-type nodes in entity-relationship store 248, (2) "machine type hypervisor" returns no matches, (3) "virtual machine" returns an exact match, and (4) "type hypervisor" returns an exact match.

In some embodiments, search engine 100 may process the query through spotlight system 246, which includes a spotlight PRC that is configured to execute a program that attaches a match type and a match score to each of the query tokens of the query. The spotlight RPC may take a query and execute a separate program that searching through entity database 248 to determine "matches" for the query, which includes exactly and "fuzzy" matched keywords/tokens that are then ranked based on match type and match score. As an example and not by way of limitation, the spotlight RPC may take a query of "MySql," process the query to determine matches from entity database 248, which may include (1) virtual machine: "MySql" (i.e., a virtual machine named "MySql"), (2) virtual machine: "MySql2" (i.e., a virtual machine named "MySql2"), (3) cluster: "MySqlCluster" (i.e., a cluster named "MySqlCluster"), and (4) virtual machine: "DRMySqlVM" (i.e., a virtual machine named "DRMySqlVm"). With regard to (1) virtual machine: "MySql," the spotlight RPC may determine that this is an exact match to the query with an edit distance of zero (0), which would correspond to a high score based on both the exact match and low edit distance. With regard to (2) virtual machine: "MySql2," the spotlight RPC may determine that this corresponds to a prefix match to the query with an edit distance of one (1), which would correspond to a relatively high score based on both the prefix match and the low edit distance. With regard to (3) cluster: "MySqlCluster," the spotlight RPC may determine that this corresponds to a prefix match with an edit distance of seven (7), which would correspond to a score between a high score and a low score because of the prefix match but the high edit distance. With regard to (4) virtual machine: "DRMySqlVM," the spotlight RPC may determine that this corresponds to a middle match and an edit distance of four (4), which would correspond to a relatively low score because of the middle match with relatively high distance. Although this disclosure describes processing of queries in a particular manner, this disclosure contemplates the processing of queries in any suitable manner.

In some embodiments, search-engine system 200 may rank the entity-type nodes based on a score determined for each of the identified entity-type nodes. The score associated with each of the identified entity-type nodes may be determined based on the lexical analysis of the input query by query interpreter 210, as discussed above. In some embodiments, the ranking of the entity-type nodes may including ranking chains of nodes (e.g., including entity-type nodes and action-type nodes) based on the maximum number of matches and contextual proximity. The maximum number of matches may correspond to the maximum chain of nodes that correspond to the query. As an example and not by way of limitation, for a search for "c1 vm latency," which corresponds to a search of the average latency of the virtual machines on cluster c1, search-engine system 200 may determine the longest to shortest chains that can be generated from the example entity-relationship graph 300 of FIG. 3C, as shown in TABLE A below.

TABLE A

| Query: "c1 vm latency" | |
|---|---|
| Rank | Chains generated |
| 1 | cluster_name = C1(attributes 370) → cluster 332 → host 334 → vm 336 → latency (metrics 380) |
| 2 | cluster_name = C1(attributes 370) → cluster 332 → latency (metrics 380) |
| 3 | cluster 332 → host 334 → vm 336 → latency (metrics 380) |
| 4 | cluster 332 → latency (metrics 380) |

In some embodiments, for each of the identified entity-type nodes, search-engine system 200 may update the respective score by incrementing a counter number associated with the identified entity-type node and each of any child entity-type nodes associated with the entity-type node by first incrementing a node counter associated with the entity-type node, then determine whether the entity-type node is associated with at least one child entity-type node. In some embodiments, when search-engine system 200 determines that the entity-type node is associated with one or more child entity-type nodes, search-engine system 200 may increment a child-node counter associated with each of the one or more child entity-type nodes. In some embodiments, the ranking of the identified entity-type nodes may be based on the counter number associated with each of the identified entity-type nodes and each of their respective child entity-type nodes. In some embodiments, search-engine system 200 may update the respective score for each node (e.g., including entity-type nodes and activity-type nodes) and any child nodes by incrementing a counter number for the node and any child nodes. The ranking of the identified nodes may be based on the maximum number of matches/hits in a chain of nodes (e.g., including entity-type nodes and activity-type nodes) based on the counter number associated with each node. In some embodiments, when multiple entity-type nodes are present in the same connected chain of nodes, the lowest entity-type node in the chain is considered the point of interest. As an example and not by way of limitation, for a query of "cluster name c1 vm power_state," as shown in FIG. 3C, the possible entity-type nodes-of-interest include cluster 332 and virtual machine 336. The lowest entity-type node, that is, the lowest one in the hierarchy, is virtual machine 336, and thus this is the entity-type node-of-interest for this query (e.g., the entity type that the user is looking for). In alternate embodiments, the results may be ranked based on search history (e.g., per user, per domain, per node type). Although this disclosure describes the ranking of nodes in a particular manner, this disclosure contemplates the ranking of nodes in any suitable manner.

In some embodiments, search-engine system 200 may, for at least a portion of the ranked entity-type nodes, generate a structured query associated with each of the entity-type nodes based at least in part of one or more activity-type nodes connected to each of the entity-type nodes. In generating the structured queries, query executor 250, via chain converter 252, may convert the ranked chains of nodes (e.g., including entity-type nodes and activity-type nodes) into structured queries while maintaining their respective ranks, and then store the generated structured queries in task queue 254. In some embodiments, the ranked chains of nodes may be converted into structured queries that represent an intent of the user. As an example and not by way of limitation, intents can include: selection (e.g., vm1 power_state), ordering (e.g., cluster ipos), grouping (e.g., vm power_state), or filtering (e.g., c1 vms). A single chain of nodes may result in multiple intents in a single structured query. In addition, conversion behavior and designation of "intents" may be configurable by search-engine system 200 or by a user. In some embodiments, the structured query associated with each entity-type node may be generated based on at least one of the activity-type nodes that is connected to the entity-type node. Although this disclosure describes generating structured queries in a particular manner, this disclosure contemplates generating structured queries in any suitable manner.

In some embodiments, search-engine system 200 may retrieve, based on the structured queries, results from one or more databases. In some embodiments, given M number of structured queries and N data sources, the combination of a structured query and the data source that the structured query is to be processed by may correspond to a single task, and thus NxM tasks may be placed into a bounded, time-limited priority-thread pool. Each data source 260 may be used to complete the M number of structured queries. As shown in FIG. 2, data sources 260 include actions database 262, entity database, 264, alerts database 266, and help database 268. When execution of all data sources 260 completes or times out, the results are then aggregated. In some embodiments, search-engine system 200 also conducts a plain text search of the one or more databases based on an original text of the query, and incorporates results of the text search into the results. This plain text search may be conducted concurrently with the structured query search (e.g., the execution of both search on data sources 260 occurs at the same or similar time), or the plain text search may be conducted after the structured query search is complete. In some embodiments, the ranking of the results may include separately ranking the results retrieved from each of the databases. The one or more databases may include an entity database including information related to the entities of the data center, one or more attributes associated with the entities, and one or more metrics associated with the entities; a workflow and actions database including information on features and actions associated with the entities; an alerts database including information on alert types and alerts associated with the entities; or a help database associated with the entities.

In some embodiments, search-engine system 200 may output the results to be presented to the user (e.g., via query output 206 shown in FIG. 2). In some embodiments, one of the results may be designated as a "top hit," and only this result will be presented to the user. In some embodiments, the ranked results retrieved from each of the databases may be grouped and filtered. As an example and not by way of limitation, the ranked results may be grouped and filtered based on entity-type node or activity-type node characteristics, other suitable grouping and filtering, and any combination thereof. The ranked results may then presented to the user separately. In some embodiments, the presenting of the ranked results to the user separately may include presenting, on a user interface, a plurality of sections comprising a summary section, an entity section, an actions section, an alerts section, and a help section.

Figure 4A:
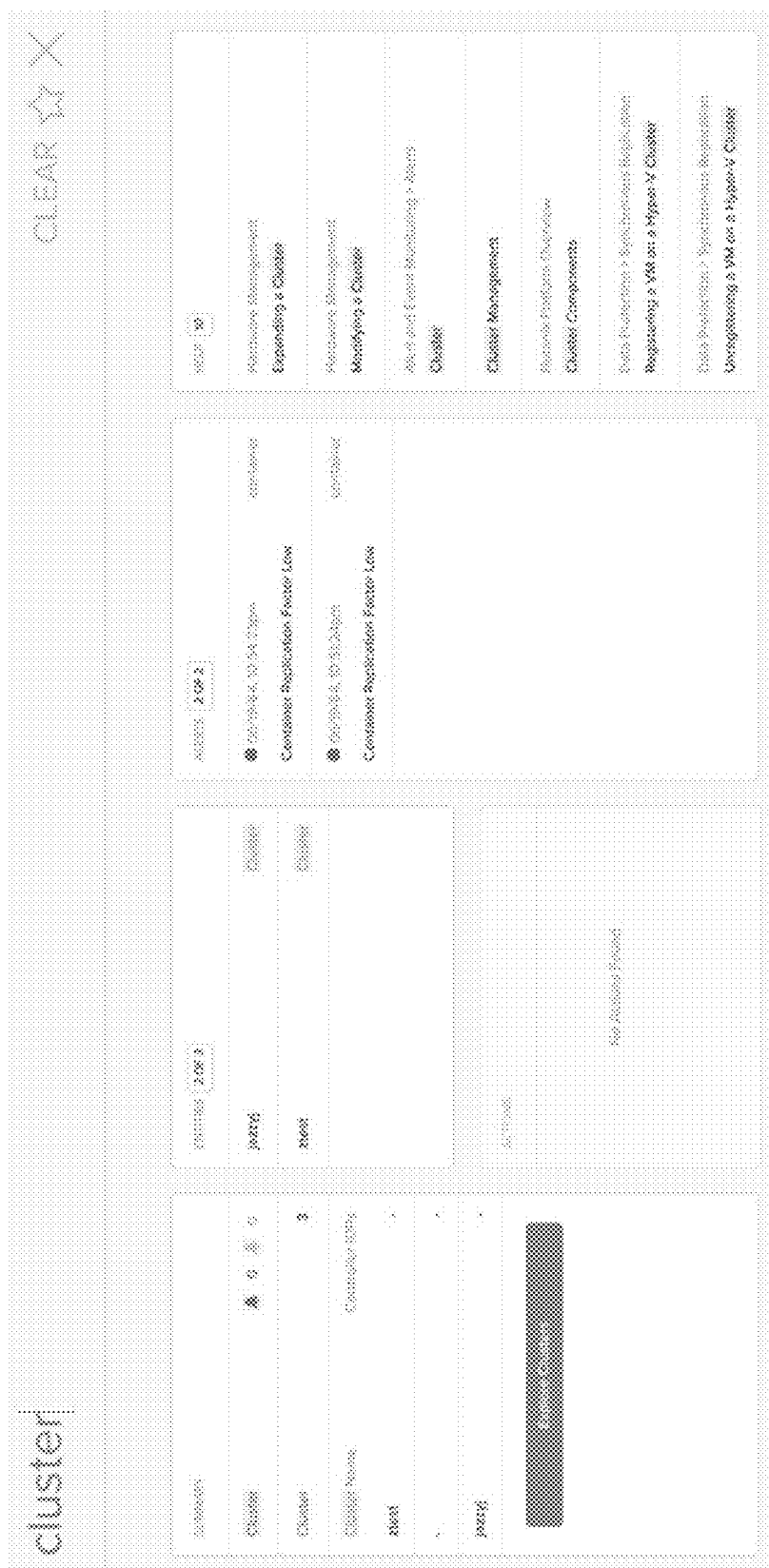
FIGS. 4A-4D illustrate examples of search results according to some embodiments of the invention.
Figure 4B:
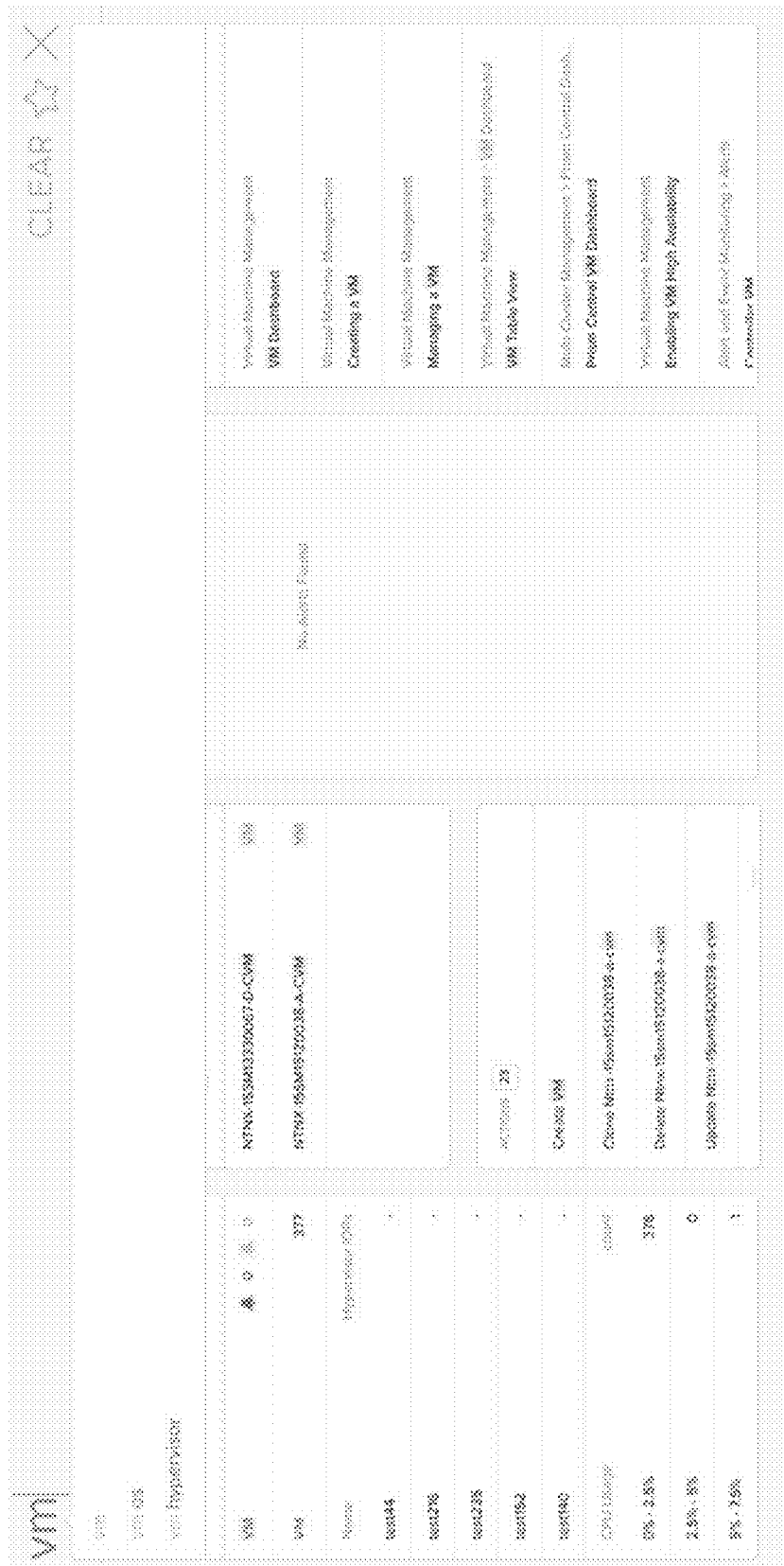
Figure 4C:
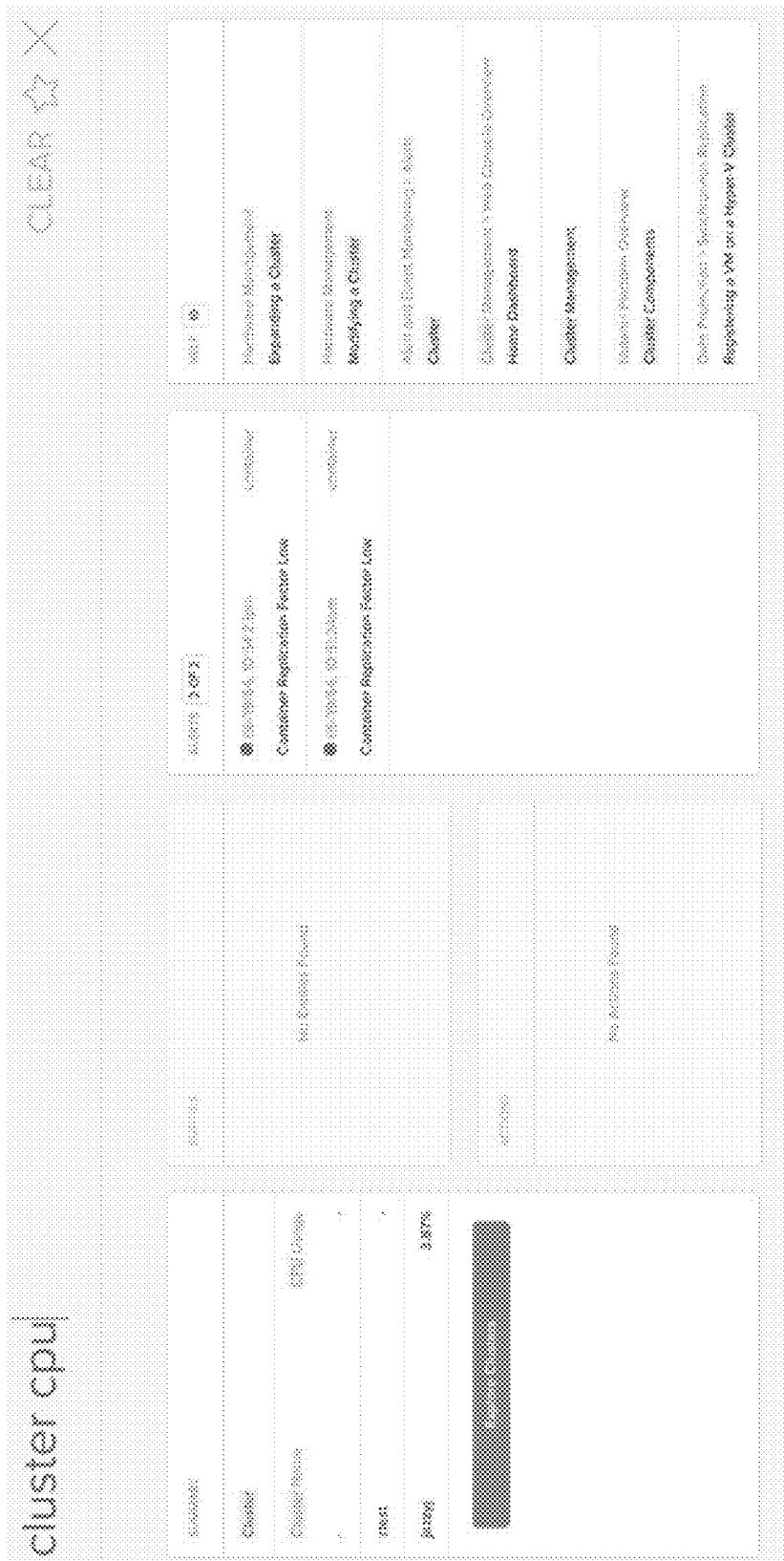
Figure 4D:
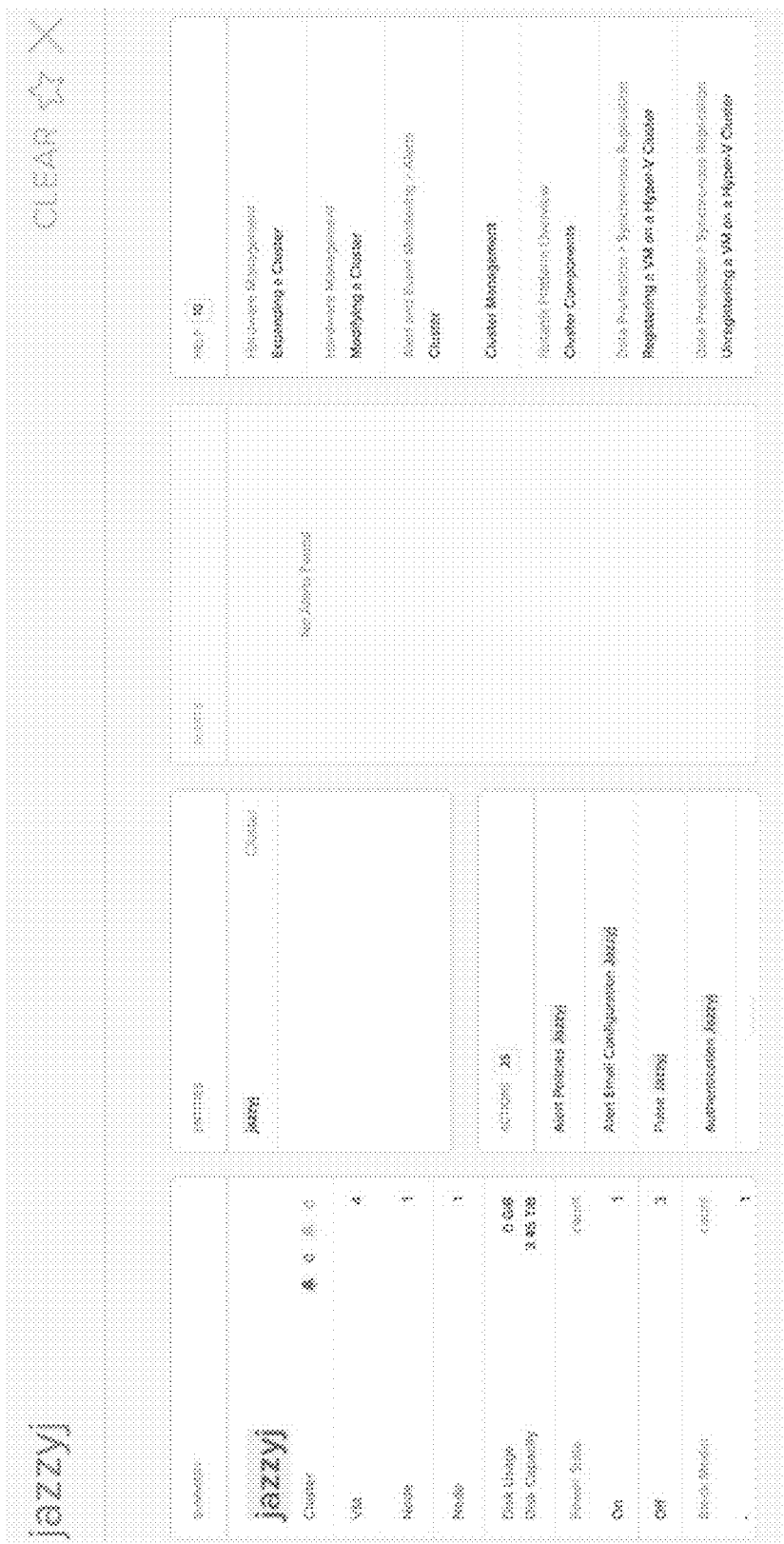

FIGS. 4A-4D illustrate examples of search results according to some embodiments of the invention. FIG. 4A illustrates an example of a user interface displaying ranked results for a search query 410 of "cluster." The results for query 410 include a summary section 420 which includes information on the clusters associated with virtualization system 100 (e.g., showing the clusters "ztest" and "jazzyj"), an entities section 422 (e.g., also showing the clusters "ztest" and "jazzyj"), an actions section 242 (e.g., showing no actions found), an alerts section 246 (e.g., showing the alerts of "container replication factor low"), and a help section 428 (e.g., including information on hardware management, alert and event monitoring, cluster management, platform overview, and data protection). FIG. 4B illustrates an example of a user interface displaying search results for a ranked query 430 of "vm." As shown, as the user types "vm," search-engine system 200 provides an autocomplete function (e.g., via the query assist 204) that presents suggestions to the user of one or more of the corresponding keywords that are determined to potentially match or correspond to the user's incomplete query (e.g., "vm os," or "vm hypervisor"). In addition, when the user pauses in his typing of the search query, a previous of the ranked results associated with query 430 may be displayed to the user. The results for query 430 include, for example, a summary section 440 which provides names of hypervisors and CPU usage information, an entities section 442 (e.g., showing example virtual machines), an actions section 442 (e.g., showing various actions such as create a virtual machine, or dine, delete, or update a particular virtual machine), an alerts section 446 (e.g., showing no alerts found), and a help section 448 (e.g., including information on virtual machine management, multi-cluster management, and alert and event monitoring). FIG. 4C illustrates an example of a user interface displaying search results for a ranked query 450 of "cluster cpu." The results for query 450 include a summary section 460 which includes information on CPU usage for certain clusters, an entities section 462 (e.g., showing no entities found), an actions section 464 (e.g., showing no actions found), an alerts section 466 (e.g., showing the alerts of "container replication factor low"), and a help section 468 (e.g., including information on hardware management, alert and event monitoring, cluster management, platform overview, and data protection). FIG. 4D illustrates an example of a user interface displaying search results for a ranked query 470 of "jazzyj." The results for query 470 include a summary section 480 which includes information that the cluster named "jazzyj" (e.g., comprising four virtual managers, one node, specific data usage and data capacity, power states of the virtual managers, and block model information), an entities section 482 (e.g., showing the cluster "jazzyj"), an actions section 484 (e.g., showing various actions that can be performed on cluster "jazzyj"), an alerts section 486 (e.g., showing no alerts found), and a help section 488 (e.g., including information on hardware management, alert and event monitoring, cluster management, platform overview, data protection, cluster management, data protection, and cluster management). Although this disclosure describes retrieving results and displaying these results on a user interface in a particular manner, this disclosure contemplates retrieving results and displaying these results on a user interface in any suitable manner.

Figure 5:
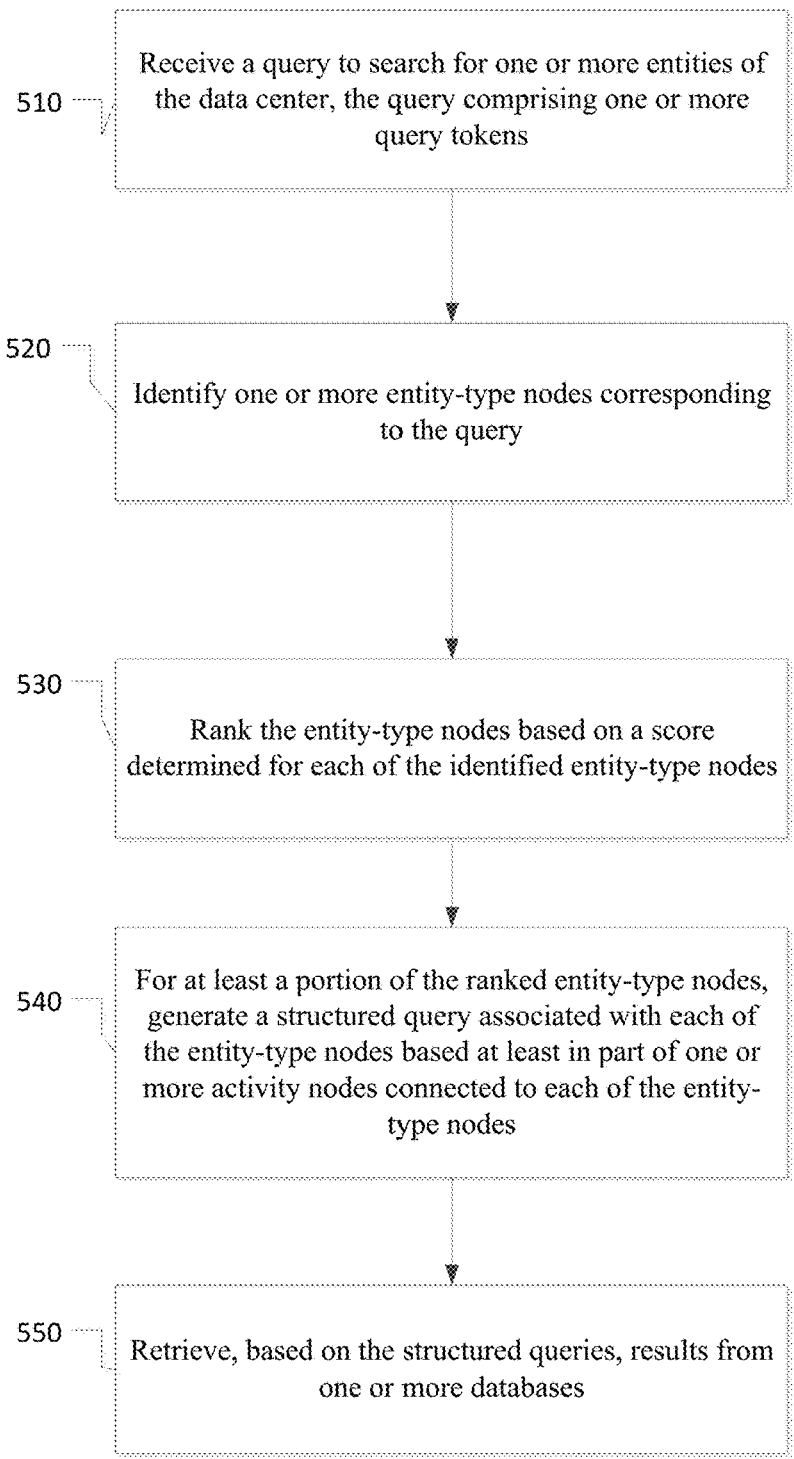
FIG. 5 illustrates an example method of executing a search query for entities of a data center.

FIG. 5 illustrates an example method of executing a search query for entities of a data center. The method may begin at step 510, where a search-engine system may receive a query to search for one or more entities of the data center The query may include one or more query tokens. At step 520, the search-engine system may identify one or more entity-type nodes corresponding to the query. At step 530, the search-engine system may rank the entity-type nodes based on a score determined for each of the identified entity-type nodes. At step 540, the search-engine system may, for at least a portion of the ranked entity-type nodes, generate a structured query associated with each of the entity-type nodes based at least in part of one or more activity-type nodes connected to each of the entity-type nodes. At step 550, the search-engine system may retrieve, based on the structured queries, results from one or more databases.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for keyword-based search of entities in virtualization environments including the particular steps of the method of FIG. 5, this disclosure contemplates any suitable method for keyword-based search of entities in virtualization environments including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
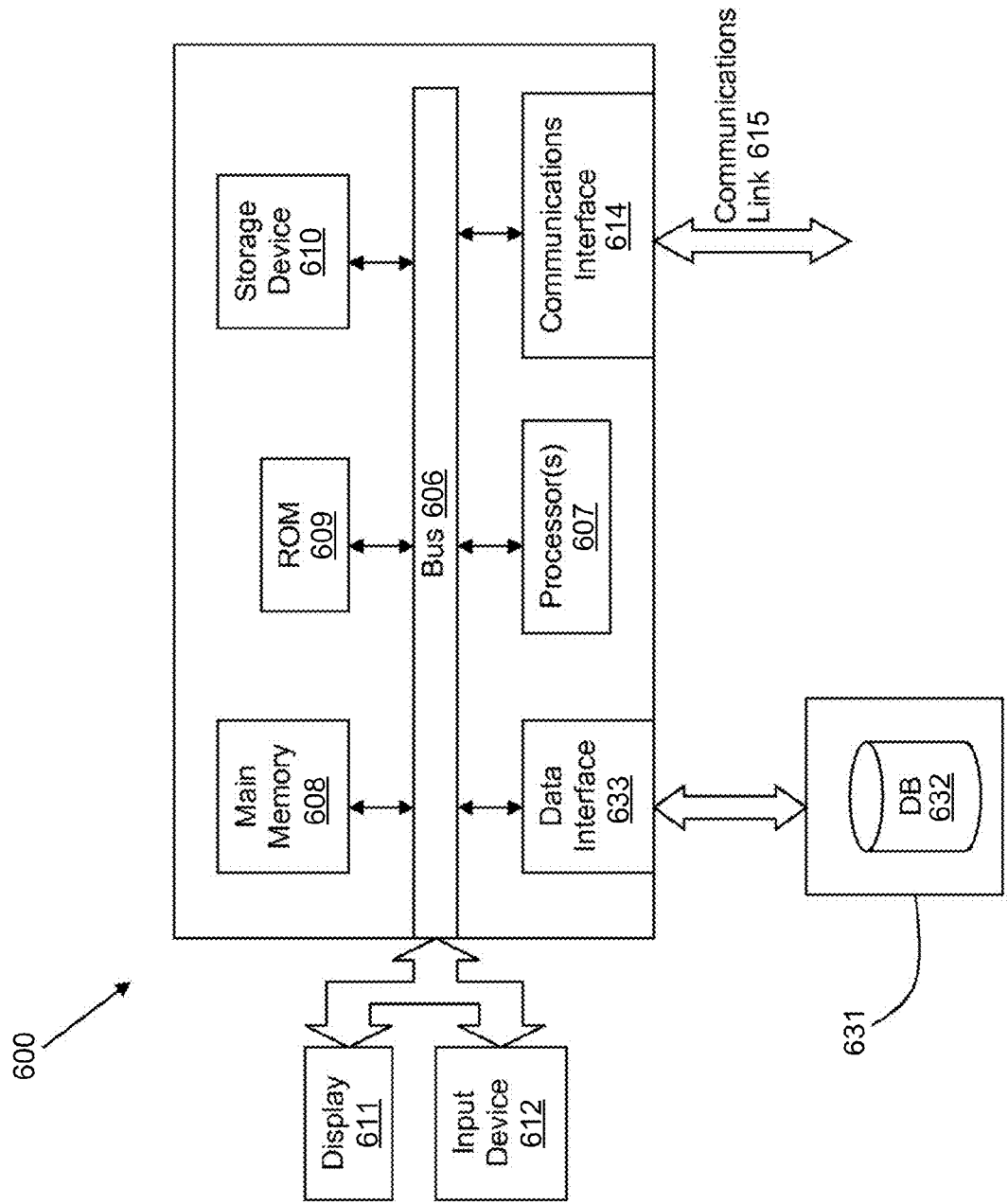
FIG. 6 illustrates a block diagram of a computing system suitable for implementing an embodiment of the present invention.

FIG. 6 is a block diagram of an illustrative computing system 600 suitable for implementing an embodiment of the present invention. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

Computer system 600 includes a bus 606 (e.g., an address bus and a data bus) or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 611 (e.g., CRT, LCD, LED), input device 612 (e.g., keyboard, keypad, mouse, microphone). In particular embodiments, computer system 600 may include one or more of any such components.

According to one embodiment of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, nonvolatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. A database 632 in a storage medium 631 may be used to store data accessible by the system 600 by way of data interface 633.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   identifying, by a search system in a virtualization environment, a first entity-type node from an entity-relationship graph representing a plurality of entities of the virtualization environment;
   forming, by the search system, one or more chains of entity-type nodes and activity-type nodes associated with the first entity-type node;
   ranking, by the search system, each of the one or more chains based upon a score assigned to each of the entity-type nodes, wherein the respective score of each of the entity-type nodes is updated by incrementing a counter number associated with the entity-type nodes and each of any child entity-type nodes associated with the entity-type nodes; and
   converting, by the search system, the ranked one or more chains into one or more structured queries based at least in part on the activity-type nodes associated with the first entity-type node.

2. The method of claim 1, further comprising:
   parsing, by the search system, a search query into a query token; and
   searching, by the search system, the entity-relationship graph to identify the first entity-type node as a node that matches the query token.

3. The method of claim 1, wherein each of the activity-type nodes comprises:
   an attribute-type node;
   an action-type node;
   an metric-type node; or
   an alert-type node.

4. The method of claim 1, further comprising:
   displaying, by the search system, search results retrieved based on the one or more structured queries on a user interface of the virtualization environment by presenting information about the activity-type nodes associated with the first entity-type node.

5. The method of claim 1, further comprising:
   querying, by the search system, one or more databases using the one or more structured queries to generate search results;
   ranking, by the search system, the results; and
   displaying, by the search system, the ranked search results on a user interface of the virtualization environment.

6. The method of claim 5, wherein the ranking of the search results comprises:
   separately ranking, by the search system, the search results retrieved from each of the one or more databases,
   wherein the ranked search results from each of the one or more databases are presented on the user interface separately.

7. The method of claim 5, wherein the search results are displayed on the user interface in a plurality of sections comprising a summary section, an entity section, an actions section, an alerts section, or a help section.

8. The method of claim 5, further comprising:
   conducting, by the search system, a text search of the one or more databases based on an original text of a search query; and
   incorporating results of the text search into the search results.

9. The method of claim 5, wherein each of the one or more databases comprises:
   an entity database comprising information related to the plurality of entities, one or more attributes associated with the plurality of entities, and one or more metrics associated with the plurality of entities;

a workflow and actions database comprising information on features and actions associated with the plurality of entities;

an alerts database comprising information on alert types and alerts associated with the plurality of entities; or a help database associated with the plurality of entities.

10. The method of claim 1, further comprising:

after receiving a portion of a completed search query, determining, by the search system, that the portion of the completed search query corresponds to a keyword recognized by the search system; and suggesting, by the search system, an additional keyword corresponding to the portion of the completed search query.

11. The method of claim 1, further comprising:

after receiving a completed search query, visually indicating on a user interface, by the search system, if a query token identified from the search query does not match at least one keyword recognized by the search system.

12. The method of claim 1, wherein incrementing the counter number comprises:

incrementing, by the search system, a node counter associated with the entity-type nodes; and incrementing, by the search system, a child-node counter associated with each of the child entity-type nodes associated with the entity-type nodes.

13. A search system comprising:

a memory configured to store instructions for executing a search query in a virtualization environment; and a processor associated with the memory and configured to execute the instructions to:

identify a first entity-type node from an entity-relationship graph representing a plurality of, entities of the virtualization environment;

form one or more chains of entity-type nodes and activity-type nodes associated with the first entity-type nodes;

rank each of the one or more chains based upon a score assigned to each of the entity-type nodes, wherein;

the respective score of each of the entity-type nodes is updated by incrementing a counter number associated with the entity-type nodes and each of any child entity-type nodes associated with the entity-type nodes; and convert the ranked one or more chains into one or more structured queries based at least in part on the activity-type nodes associated with the first entity-type node.

14. The search system of claim 13, wherein the processor is further configured to:

detect a pause in entry of the search query on a user interface of the virtualization environment before the search query is submitted; and present a preview of search results on the user interface based on the search query entered before the pause.

15. The search system of claim 13, wherein the processor is further configured to:

parse the search query into one or more query tokens; and for each of the one or more query tokens, search the entity-relationship graph to identify the first entity-type node as a node that matches the respective one of the one or more query tokens.

16. The search system of claim 15, wherein the processor is further configured to:

associate a match score with each of the one or more query tokens based upon a comparison of a respective one of the one or more query tokens with information associated with the plurality of entities of the virtualization environment; and rank each of the one or more query tokens based on the match score.

17. A non-transitory computer-readable media including computer-executable instructions embodies thereon that, when executed by a processor of a search system in a virtualization environment, cause the search system to perform a process comprising to:

identifying first entity-type node from an entity-relationship graph representing a plurality of entities of the virtualization environment;

forming one or more chains of entity-type nodes and activity-type nodes associated with the first entity-type nodes;

ranking each of the one or more chains based upon a score assigned to each of the entity-type nodes, wherein the respective score of each of the entity-types nodes is updated by incrementing a counter number associated with the entity-type nodes and each of any child entity-type nodes associated with the entity-type nodes; and converting the ranked one or more chains into one or more structured queries based at least in part on the one or more activity-type nodes associated with the first entity-type node.

18. The non-transitory computer-readable media of claim 17, further comprising:

incrementing a node counter associated with the entity-type nodes; and incrementing a child-node counter associated with each of the child entity-type nodes associated with the entity-type nodes.

19. The non-transitory computer-readable media of claim 17, further comprising dividing search results for displaying in a plurality of sections on a user interface, the plurality of sections comprising a summary section, an entity section, an actions section, an alerts section, or a help section.

* * * * *